United States Patent [19]
Hauser

[11] Patent Number: 5,910,203
[45] Date of Patent: Jun. 8, 1999

[54] WIRE SAWING DEVICE

[75] Inventor: Charles Hauser, Genolier, Switzerland

[73] Assignee: HCT Shaping Systems SA, Cheseaux, Switzerland

[21] Appl. No.: 08/796,108

[22] Filed: Feb. 5, 1997

[30] Foreign Application Priority Data

Feb. 6, 1996 [CH] Switzerland ................................ 303/96

[51] Int. Cl.⁶ ..................................................... B26D 1/44
[52] U.S. Cl. ........................ 83/651.1; 83/659; 125/16.01; 125/16.02; 125/21
[58] Field of Search ................................ 83/651.1, 659; 125/16.01, 21, 16.02

[56] References Cited

U.S. PATENT DOCUMENTS

| | | | |
|---|---|---|---|
| 3,525,324 | 8/1970 | Bonnefoy | 125/16.01 |
| 4,134,384 | 1/1979 | Schafft et al. | |
| 4,982,639 | 1/1991 | Kirkpatrick | 83/659 |
| 5,269,285 | 12/1993 | Toyama et al. | 125/21 |

FOREIGN PATENT DOCUMENTS

| | | | |
|---|---|---|---|
| 24 28 111 | 1/1975 | Germany. | |
| 2852521 | 6/1979 | Germany | 83/659 |
| 5-146968 | 6/1993 | Japan. | |

*Primary Examiner*—M. Rachuba
*Assistant Examiner*—Sean A. Pryor
*Attorney, Agent, or Firm*—Young & Thompson

[57] ABSTRACT

The sawing device comprises a layer of parallel wires (2) moving with alternating or continuous movement whilst bearing against a piece (1) to be sawed fixed on a support table (3), the whole being maintained by a frame (14). The device comprises wire guide cylinders (4) having an interchangeable surface constituted by removable segments (6) fixed mechanically and/or by cementing. The removable segments (6) are pre-incised or not, with grooves (9). Said wire guide cylinders (4) need accordingly not be taken out of the frame (14) for the changing operation of the removable segments (6) and/or of the regeneration of the surface.

11 Claims, 3 Drawing Sheets ion corresponds to Swiss application 303/96

WIRE SAWING DEVICE

This application corresponds to Swiss application 303/96 of Feb. 6, 1996, the disclosure of which is incorporated herein by reference.

FIELD OF THE INVENTION

The present invention relates to a wire sawing device comprising a layer of wires stretched between at least two wire guide cylinders and held in position by grooves provided on the surface of the wire guide cylinders and which define the interval between the wires of the layer which are adapted to move with alternating or continuous movement while bearing against a piece to be sawed mounted on a support.

BACKGROUND OF THE INVENTION

There are known wire sawing devices comprising generally a layer of wires adapted to move with continuous or alternating movement while bearing against a piece to be sawed defining thereby a sawing zone. The sawing zone is constituted of an assembly of cylinders disposed in parallel. These cylinders, called wire guides, are engraved with grooves defining the interval between the threads of the layer, and hence the thickness of the slices. The piece to be sawed is fixed on a support table which moves perpendicularly to the layer of wires. The speed of displacement defines the speed of cutting. The renewal of the wire as well as the control of its tension are carried out in a so-called control portion for the wire located outside the sawing zone properly so called. The agent which will control cutting is either an abrasive fixed on the wire, or else a free abrasive through which the wire runs. The wire acts only as a transporter.

During cutting of thin slices of the piece to be sawed, the stretched wire is both guided and tensioned by the wire guide cylinders. These cylinders generally clad with a layer of synthetic material, are engraved with grooves whose geometry and dimensions must have a high precision. The process of cutting out which uses either a fixed abrasive or a free abrasive, gives rise necessarily to wear of the material which constitutes the surface of the wire guide cylinders, and hence modifies the dimensions and the geometry of said grooves. The wire guide cylinders are conventionally constituted by a hollow or filled monoblock portion clad with a synthetic element into which are engraved the grooves maintaining the spacing of the wires of the layer and fixed at least at one of its ends by one or more blocks including ball-bearings. The wire guide is demountable to be reconditioned after wear of its coating. These wire guide cylinders, which constitute wear elements, have a limited lifetime and the grooves provided at their surface must be periodically reworked by rectification, or turning. This operation takes place away from the sawing device, on a rectifying cylinder or a numerical control tower, for example. The number of reworkings depends on the size of each work, on the geometry of the grooves and of the initial thickness of the cladding. When the cladding is completely used up, one positions on the wire guide cylinder a new coating, by molding, which can be injection molding or any other method which seems suitable for the chosen cladding. When a reworking becomes necessary, the wire guide cylinders must be dismounted and removed from the sawing device. This operation is generally troublesome because of the mechanical complexity of the wire guide cylinders and their drive systems. Moreover, the operation requires the assistance of outside handling. Thus, there is a substantial stopping of the sawing device, which would decrease overall productivity of the assembly. During a change of the thickness of the slices to be sawed, a change of the interval of the grooves out on the surface of the wire guide is necessary and requires also a change of the wire guide cylinders, which is a long and complex and hence undesirable operation.

The precision of the slices, which is very important in electronic applications, depends on the position of the wires in the course of sawing, as well as on the support elements of the piece to be sawed, hence of the position of the wire guide cylinders relative to the piece to be sawed, but also on the quality of the geometry of the grooves cut in the surface of the wire guides. Wear of the grooves gives rise to a degradation of the precision of the slices obtained. It is clear that stopping the sawing device to re-machine the grooves is done only when absolutely necessary and hence there is the tendency to put this off until the last moment, giving rise by this fact to a decrease in the mean quality of the slices thus obtained.

The present invention has for its object to overcome the mentioned drawbacks.

There is thus obtained a very rapid and easy renewal or regeneration of the wire guide grooves and an improvement of the precision of the slices, because the regeneration of the surface is facilitated and uncomplicated. The changes in the interval between the grooves for the modification of the thickness of the slices are also greatly facilitated.

Preferably, the external cladding comprises removable segments adapted to be fixed on the periphery of the cylinders.

This characteristic even more facilitates the operations of renewal and of changing in situ the external portion of the wire guide cylinders.

Thus, to avoid demounting the assembly of the wire guide cylinders for re-machining the grooves, the operation can be carried out by changing only the surface of the wire guide cylinders by giving them a removable surface, by mechanically fixed or cementing, or both. The surface may be solely the synthetic portion, in general of polyurethane, or a series of assembled segments, clad or not with a layer of synthetic polyurethane for example. The machining of the grooves can take place in situ in the sawing device by a re-cutting mechanism which permits re-machining the grooves on the surface of the wire guide cylinders without dismounting the latter, or before mounting the removable segments on a tower or a numerically control alignment device for example. This thus permits regeneration after wear, or the changing of the interval of the grooves for the modification of the thickness of the slices.

This sawing technique, which requires a perfect geometry of the grooves, will enjoy increased precision of the slices by virtue of the fact that the regeneration of the surface is facilitated by the rapid interchangeability of the removable assembled segments and that machining can be done in situ or before mounting, on the removable segments.

The requirements of productivity and of precision of the usages in the semiconductor field, connected to the increasing dimensions of the pieces to be sawed and hence of the slices, require that, even small variations must be avoided. The use of assembled segments, precut or not, permits the regeneration of the surface and the changing of the interval in an easy and hence more frequent manner. Moreover, it requires low supplemental investment because only the segments are necessary and not the whole of the wire guide cylinders.

The invention thus permits the sawing device to use the concept of interchangeability of the surface of the wire guide cylinders and the use of removable segments, to respond to new requirements of technology, by suppressing a long and delicate operation which is the complete dismounting of the wire guide cylinders whilst improving the quality of performance geometrically as well as productivity-wise. The sawing device therefore comprises wire guide cylinders with an interchangeable surface preferably in the form of removable segments held mechanically or by cementing and having their surface precut or not with grooves.

The wire guide cylinders with interchangeable surface will be present in the form of a base cylinder that can receive on its surface and with an indexed position, segments that are coated or not, on which are incised the grooves serving for spacing the windings of sawing wire. These grooves can be pre-cut on an external cutting machine having indexing positions identical to those of the wire guide cylinder, so as to guarantee the position of the grooves after mounting on the wire sawing device.

The use of the concept of interchangeability of the surface therefore permits providing a sawing device performing with high productivity, increased mean precision and permitting easy modification of the thickness of the slices produced.

Other advantages will become apparent from the characteristics set forth in the dependent claims and from the description hereafter set forth the invention in more detail with the aid of drawings which show schematically and by way of example an embodiment and a modification.

DESCRIPTION OF THE PREFERRED EMBODIMENTS

Figure 1:
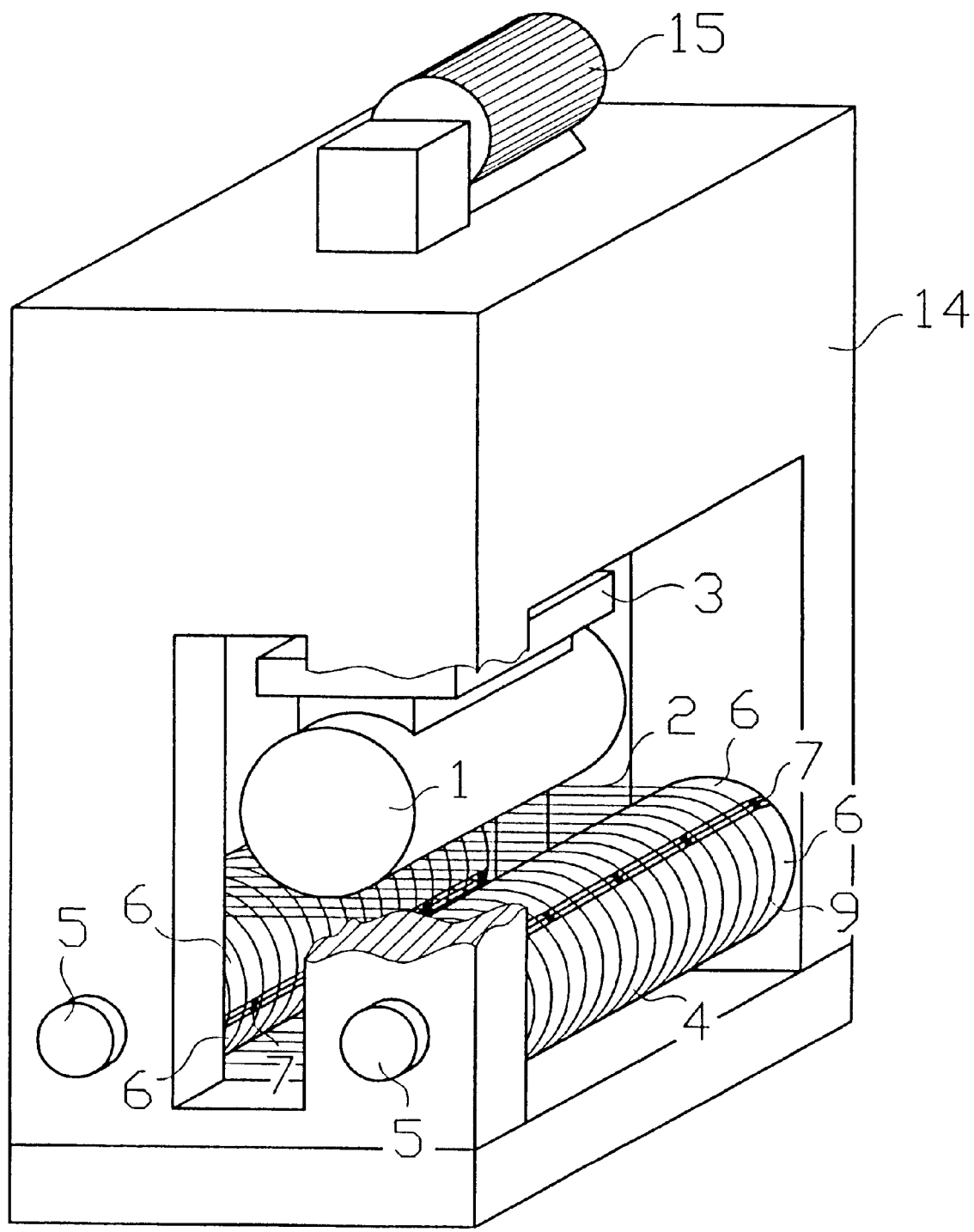
FIG. 1 is a perspective view of an embodiment of the wire sawing device.

The wire sawing device of FIG. 1 shows the principle of the present invention. The piece to be sawed 1 is brought to bear against the layer of wires 2 supported by wire guide cylinders 4. The support table 3 on which is secured the piece to be sawed 1 is moved by the motor 15. The wire guide cylinders 4 are supported at their ends by bearings 5. The removable segments 6 are fixed mechanically on the surface of the wire guide cylinders 4 by screws 7. The assembly is mounted in a frame 14. The wires of the layer 2 are adapted to be driven by known means, so as to be displaced with alternating or continuous movement. The external surface of the segments 6 comprises engraved grooves 9 in which the wire is disposed. The grooves 9 define the interval between the wires of the layer 2, hence the thickness of the cut slices. Given that the segments 6 are fixed mechanically and/or by cementing on the surface of the wire guide cylinders 4, it is possible to renew them or to change them after wear or when it is desired to modify the distance separating the grooves 9 without at the same time dismounting and placing out of service the wire guide cylinders 4.

Figure 2:
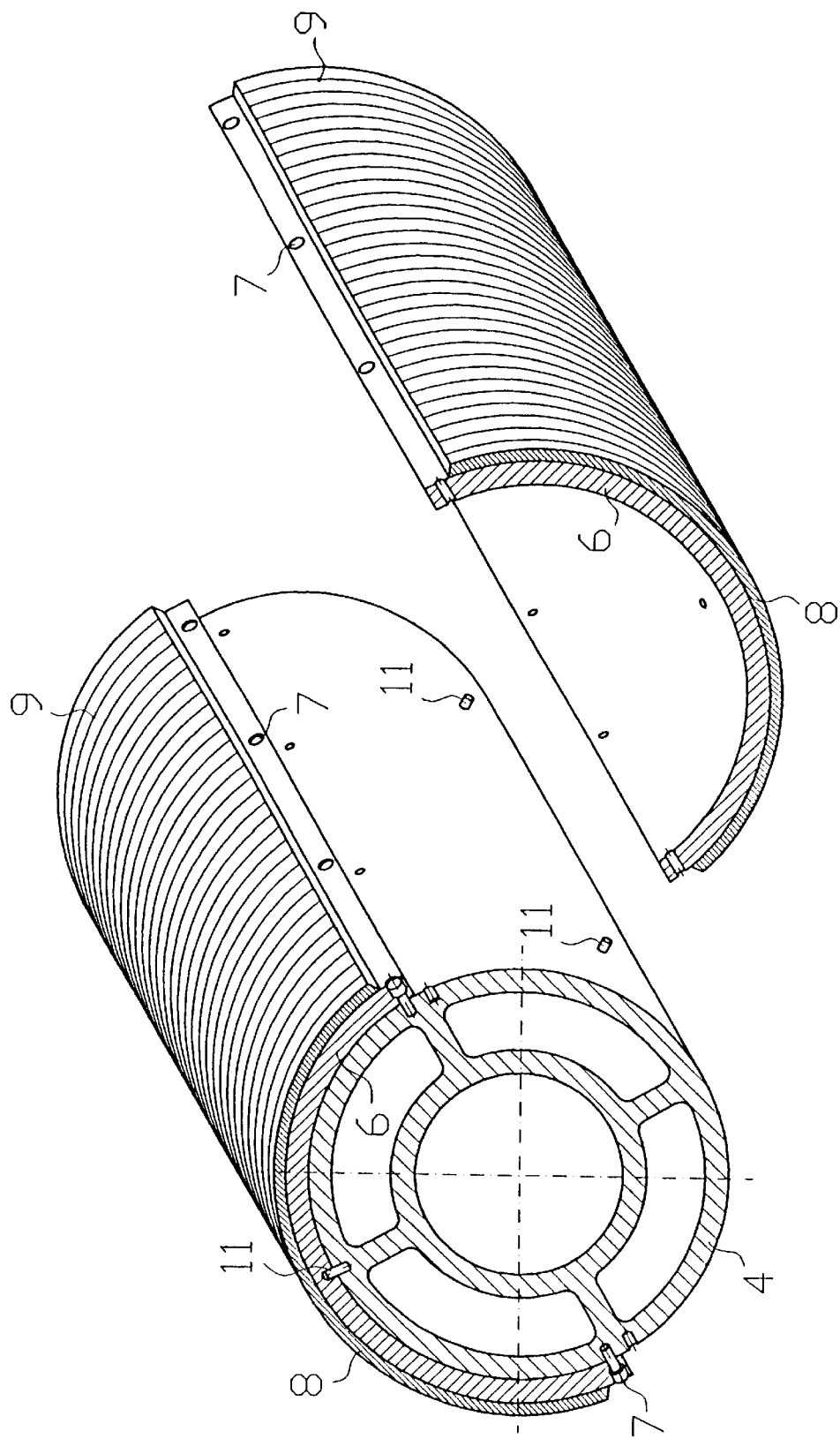
FIG. 2 is a perspective view of a wire guide cylinder.

FIG. 2 shows in perspective a wire guide cylinder 4 with a fixed axle, with two removable segments 6 covered with a layer 8 of polyurethane pre-cut with grooves 9 and fixed on the wire guide cylinder 4 mechanically by securement screws 7. The segments are positioned on the wire guide cylinder 4 by positioning pins 11. The removable segments 6 are of metal and this latter is selected preferably to have a low coefficient of thermal expansion, for example, an iron-nickel alloy.

Figure 3:
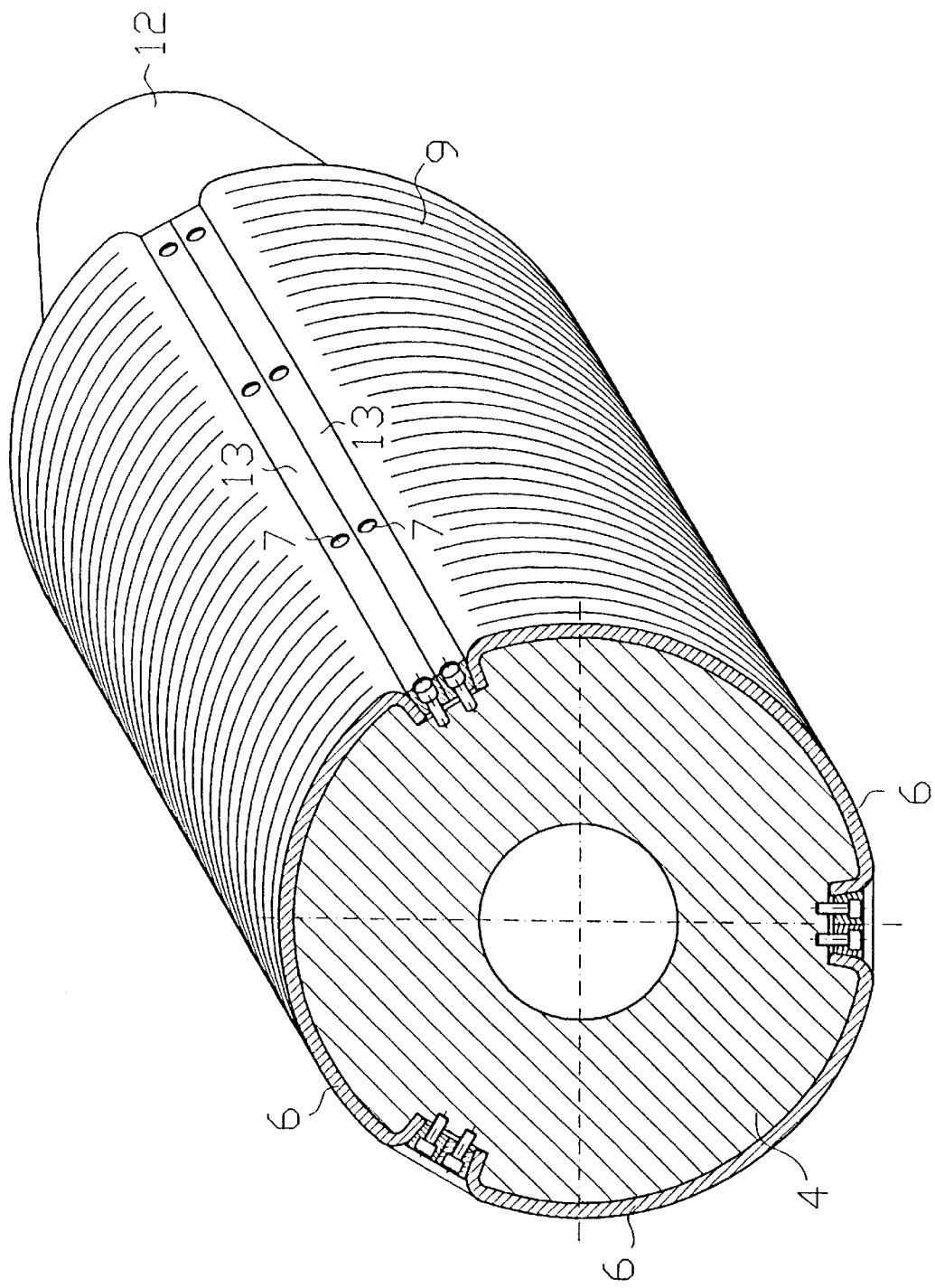
FIG. 3 shows a modified wire guide cylinder.

FIG. 3 shows a perspective of a modification of the wire guide cylinder 4 for securement on cones 12. The three removable segments 6 are of sheets of synthetic material, preferably polyurethane, stretched and locked on the surface by securement strips 13 fixed mechanically on the surface by screws 7. Cementing of the polyurethane sheets 6 associated with a suitable surface texture of the wire guide cylinder 4 holds the latter in position on the surface of the wire guide cylinder 4.

Generally speaking, the sawing wire forming the layer of wires 2 between the wire guide cylinders 4 is constituted of spring steel of a diameter comprised between 0.1 and 0.2 mm so as to saw the blocks of hard material or of more particular compositions, such as silica, ceramics, compounds of group III-V elements, GGG (gadolinium-gallium garnet), sapphire, etc., in slices of about 0.1 to 5 mm thickness. The abrasive agent is a commercial product and can be diamond, silicon carbide, alumina, etc., in a form fixed to the wire or in free form with the wire drawn through it.

The sawing device permits by the concept of interchangeability of the surface of the wire guide cylinders 4 by the provision of removable segments 6, obtaining maximum performance, productivity and flexibility, without detriment to the quality of the pieces produced.

Of course the embodiments described above are in no way limiting and can be the subject of any desirable modification within a scope as of the invention.

Thus, other types of interchangeable surfaces can be envisaged which by their design also have the function of regeneration and/or renewal of the surface without demounting the wire guide cylinders 4. The joint unrolling of a profiled cord or strip on the surface can be envisaged. Recharging by pulverization in the sawing device for example, can also satisfy the concept of interchangeability of the surface and can satisfy the object of the present invention if it does not require complete dismounting of the wire guide cylinder 4.

What is claimed is:

1. A wire sawing device comprising:
   a frame;
   at least two wire guide cylinders,
   each of said cylinders comprising a central cylindrical part rotatably supported at each of its axial ends by said frame, and at least two removable surface segments having grooves in an exterior surface which define intervals for sawing, said surface segments being removably affixed to said central part by securement means that are in recesses in an outer cylindrical surface of the respective one of said wire guide cylinders,
   wherein said recesses extend longitudinally parallel to respective axes of said cylinders.

2. The device according to claim 1, wherein said segments include metal clad with a synthetic material layer, said grooves being located in said synthetic material layer.

3. The device according to claim 2, wherein said metal has a low coefficient of thermal expansion, said synthetic material being polyurethane.

4. The device according to claim 1, wherein said securement means comprises a plurality of positioning pins for ensuring a precise mounting of said segments on respective ones of said wire guide cylinders.

5. The device according to claim 1, wherein said segments include sheets of synthetic material.

6. The device according to claim 1, wherein said securement means comprises one of screws and securement strips in said longitudinal recesses.

7. The device of claim 1, wherein said recesses are between grooved portions of said segments and are free of said grooves.

8. The device of claim 7, wherein said recesses are deeper than said grooves.

9. The device of claim 1, wherein said recesses are deeper than said grooves.

10. The device of claim 1, wherein said recesses are transverse to s aid grooves.

11. The device of claim 1, wherein said surface segments comprise depressed end portions that are without said grooves, said end portions of adjoining ones of said segments forming said recesses.

* * * * *